United States Patent
Nehr

[15] 3,666,061
[45] May 30, 1972

[54] VEHICLE BRAKE ASSEMBLY
[72] Inventor: Charles W. Nehr, Bloomfield, Mich.
[73] Assignee: North American Rockwell Corporation, Pittsburgh, Pa.
[22] Filed: July 13, 1970
[21] Appl. No.: 54,173

[52] U.S. Cl. ..........................188/206 R, 188/216, 188/335, 188/340
[51] Int. Cl. ......................................................F16d 65/08
[58] Field of Search..................188/2 R, 18 R, 206 A, 206 R, 188/216, 250 C, 326, 335, 340, 343

[56] References Cited

UNITED STATES PATENTS

| | | | |
|---|---|---|---|
| 2,082,244 | 6/1937 | Dick | 188/340 |
| 2,431,551 | 11/1947 | Goepfrich | 188/206 X |
| 3,339,677 | 9/1967 | Behnke | 188/206 A X |
| 3,378,113 | 4/1968 | Hanley et al. | 188/206 A |

Primary Examiner—Duane A. Reger
Attorney—John R. Bronaugh, E. Dennis O'Connor and Floyd S. Levison

[57] ABSTRACT

A brake assembly adapted to be mounted on a motor vehicle axle member and constructed to permit removal of the assembly brake shoes for relining without removal of the brake drum or other structure located outboard of the assembly. The assembly includes a spider abutting the outboard surface of and secured to a radial flange formed on the axle. The spider carries brake shoes located inboard of the spider-axle flange interface that are held in place by brake shoe return springs attached to the shoes and the inboard face of the spider at a point easily accessible from inboard of the assembly. Lateral brake shoe movement along the axle axis is prevented by brake shoe retaining members normally located outboard and inboard of the brake shoes. The inboard of these retaining members are removable to permit the brake shoes to be removed from the assembly by inboard movement thereof.

9 Claims, 3 Drawing Figures

Patented May 30, 1972

INVENTOR.
Charles W. Neher

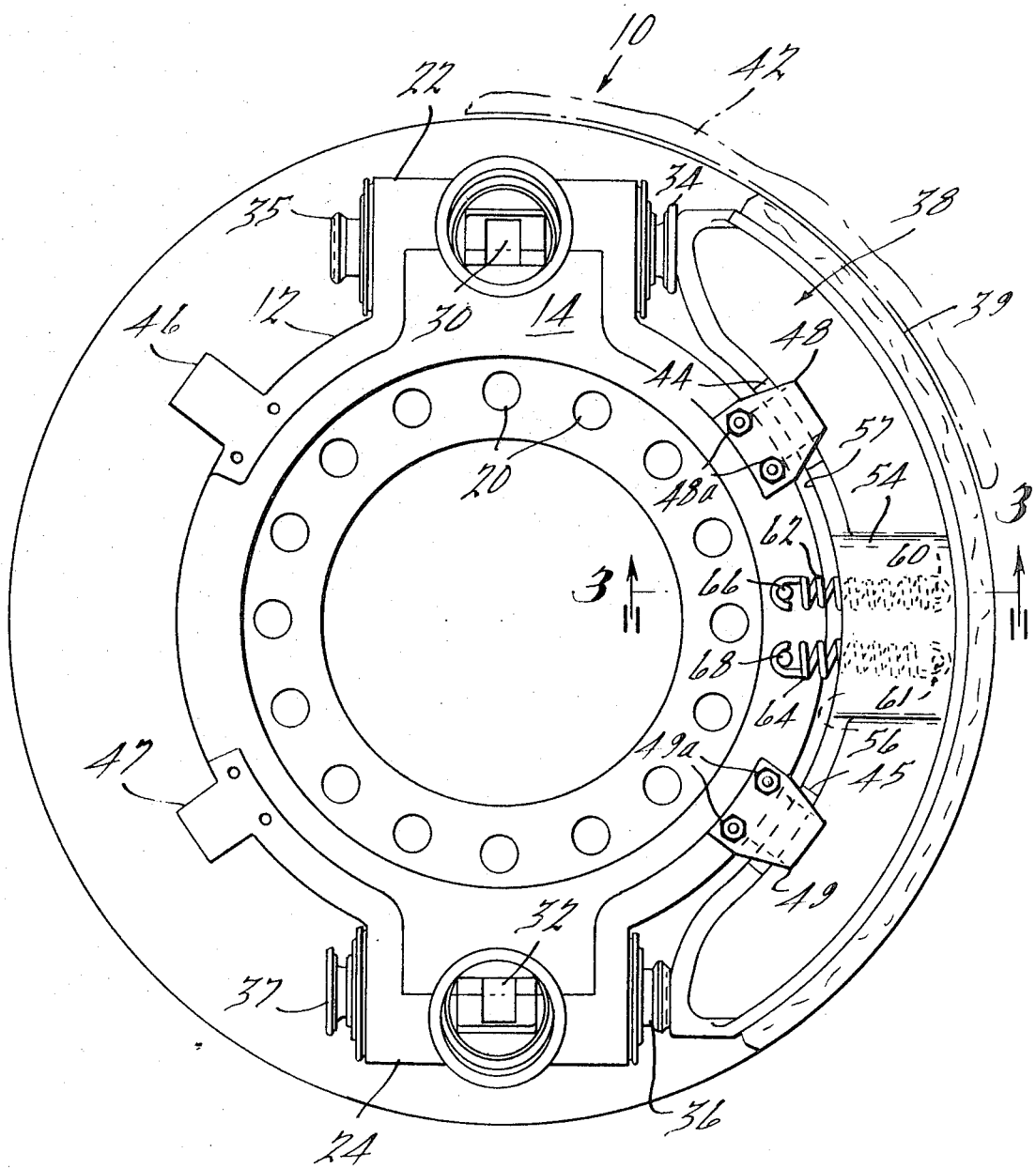

VEHICLE BRAKE ASSEMBLY

BACKGROUND OF THE INVENTION

In order to remove the brake shoes for relining in certain conventional motor vehicle brake assemblies, it is necessary to disassemble large portions of the vehicle axles mounting such brake assemblies in order to gain access to and permit removal of the brake shoes. An example of such an assembly is one mounted on a vehicle drive axle of the planetary type. This type of drive axle has a planetary gear set, as well as a conventional brake drum, wheel and rim, mounted outboard of each of the brake assemblies carried by the axle. In many heavy equipment applications, these gear sets are extremely large in size and weight and can be removed from the axle only by use of special equipment such as a hoist or crane. Large labor efforts also must be expended to accomplish removal of such gear sets.

The relining of brake shoes is part of the regular maintenance program that must be accomplished periodically on a vehicle brake assembly in order to insure satisfactory brake performance and vehicle operation. It thus readily can be understood that if brake shoe relining must be preceded by the removal of planetary gear sets as well as brake drums, wheels and rims the accomplishment of this ordinary maintenance operation will result in lengthy vehicle down time due to the necessary use of special equipment and the performance of time consuming manual tasks. Also, substantial efforts and time must be expended even if no planetary gear set is involved, as all structure carried by the axle outboard of conventional brake assemblies must be removed from the axle and reassembled attendant a brake relining job.

An object of this invention is to provide a vehicle brake assembly designed and constructed so that the brake shoes can be removed for inspection and/or relining without the need to remove any of the vehicle structure carried outboard of the brake assembly by the axle mounting this brake assembly. This simplification of relining procedure allows great economic savings by reducing vehicle down time.

In particular, the brake assembly of this invention is such that the brake shoe return springs securing the brake shoes to the spider are accessible from inboard the brake assembly and easily may be detached manually from the spider. In addition, the inboard brake shoe retaining member normally located inboard of the brake assembly easily may be removed so that the brake shoe may be taken from the brake assembly by a workman working from inboard the brake assembly.

DESCRIPTION OF THE DRAWINGS

FIG. 2 is a view taken along the line of sight identified by the arrow 2 in FIG. 1, with portions of the structure shown in FIG. 1 removed for purposes of clarity.

DETAILED DESCRIPTION OF THE INVENTION

Figure 1:
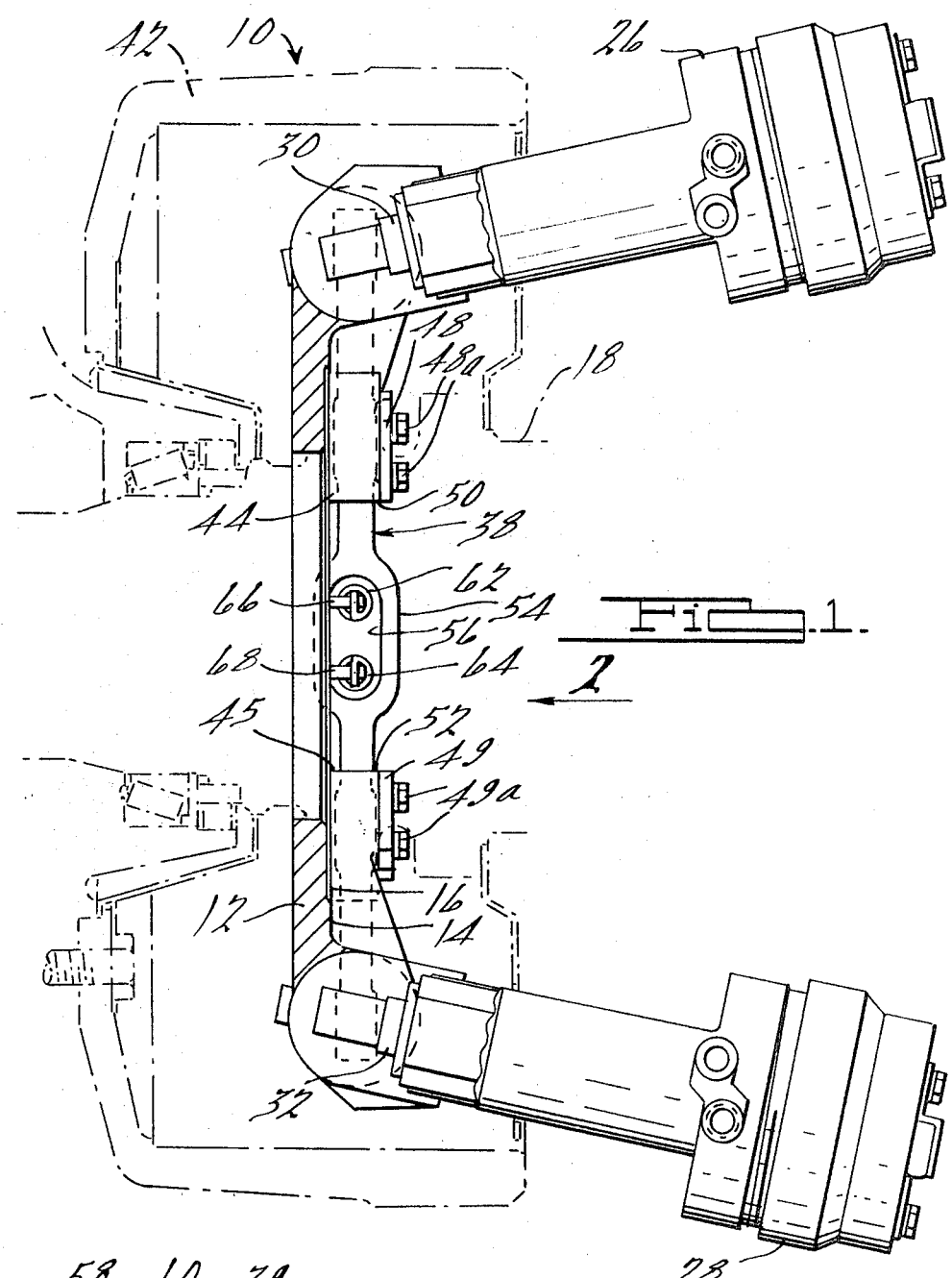
FIG. 1 is a side view, partly in section and partly in elevation, illustrating a vehicle brake assembly according to this invention and illustrating in phantom certain attendant structure.

Referring now in detail to the drawings and in particular to FIGS. 1 and 2 thereof, the numeral 10 denotes generally a vehicle brake assembly constructed in accordance with this invention. This assembly includes a support member or spider 12 having an inboard face 14, a portion of which abuts the outboard face of a radially extending flange 16 projecting from a vehicle axle member 18. As is conventional, member 18 extends through a central aperture formed in spider 12.

Integrally formed as part of spider 12 are upper and lower brake actuating mechanism housings 22 and 24. Fluid motors 26 and 28 are secured to housings 22 and 24 respectively such that the motor output members 30 and 32 extend into the housings 22 and 24. The brake actuating mechanisms of assembly 10, including the fluid motors 26 and 28 and the structure contained within the housings 22 and 24, do not constitute part of the present invention and may be the brake actuating mechanisms described in U.S. Pat. No. 3,322,241, issued May 30, 1967, to F. T. Cox et al., and assigned to the assignee of this invention. It is sufficient for purposes of this description to note that upon actuation of fluid motors 26 and 28, motor output members 30 and 32 move within housings 22 and 24 and a following movement of brake shoe actuating members 34, 35 and 36, 37 outwardly away from housings 22 and 24 occurs.

Positioned about a portion of the outer periphery of spider 12 is a brake shoe 38. Opposite ends of brake shoe 38 are contacted by actuating members 34 and 36 so that movement of these actuating members away from the housings 22 and 24 will cause a radially outward movement of brake shoe 38 and the lining 40, secured to the outer extremity of the brake shoe, will contact brake drum 42 for braking action.

A second brake shoe, identical to brake shoe 38, is positioned diametrically across spider 12 from brake shoe 38 and is in contact with actuating members 34 and 35. This second brake shoe has been omitted from FIG. 2 of the drawings for purposes of clarity. It readily may be understood that the construction and operation of this second brake shoe are identical to that detailed herein relative to brake shoe 38.

Lateral movement of brake shoe 38, that is movement of the brake shoe in inboard and outboard directions along the axis of axle member 18, effectively is prohibited by a plurality of retainers. A pair of outboard retainers 44 and 45 are integrally formed with and project from spider 12. (The outboard retainers 46 and 47 utilized to position the second brake shoe that is not illustrated clearly may be seen in FIG. 2.) Inboard movement of brake shoe 38 is prevented by the presence of inboard retainers 48 and 49 secured to spider 12 by fasteners 48a and 49a respectively.

The inboard and outboard retainers locating brake shoe 38 laterally cooperate to define outwardly open ended channel 50 between retainers 44 and 48, and channel 52 between retainers 45 and 49. Upon the actuation of fluid motors 26 and 28, radially directed outward movement of brake shoe 38 occurs within channels 50 and 52.

Figure 3:
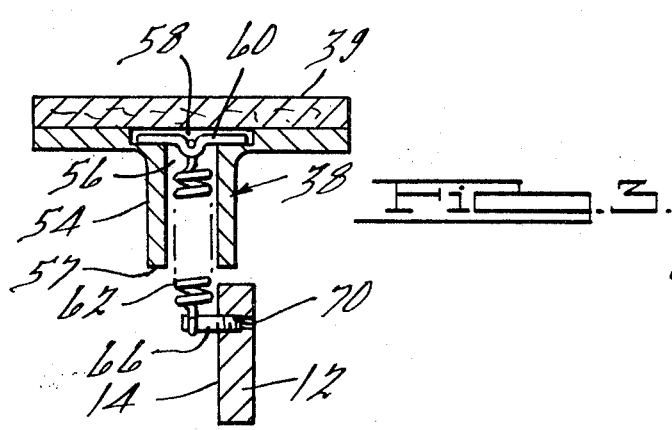
FIG. 3 is a partial section view taken along the line 3—3 of FIG. 2.

Referring now in particular to FIGS. 1 and 3 of the drawings, it may be seen that the mid portion 54 of brake shoe 38 is bifurcated and defines an aperture 56 extending therethrough in a radial direction. This aperture extends through the inner face 57 of brake shoe 38 and communicates with a recess 58 formed in the outer face of the brake shoe. A brake lining 39 closes the outer extremity of recess 58. A pair of spring attachment members 60 and 61 are located within recess 58. These attachment members are placed in the recess 58 prior to the brake shoe lining 39 being secured to the outer face of brake shoe 38.

A pair of tension coil springs 62 and 64 are located within aperture 56 and extend generally radially. The outer ends of springs 62 and 64 are secured to spring attachment members 60 and 61 respectively. Each of the inner ends of these springs is secured to one of pins 66 and 68 that extend from the inboard face 14 of spider 12. As readily may be seen from FIG. 3, pin 66 has a threaded end that is received in a threaded bore 70 formed in spider 12. Pin 68 is secured to the spider in a similar manner.

The interconnection between spider 12 and brake shoe 38 by springs 62 and 64 provides an inwardly directed force on the brake shoe that returns the brake shoe to the normal position, remote from drum 42, upon the deactivation of the fluid motors 26 and 28.

The design and construction of the vehicle brake assembly described heretofore permits removal of the brake shoe for inspection and/or replacement of the brake shoe linings without the necessity of removing brake drum 42 and other structure positioned outboard of the brake assembly on the axle member 18. The brake shoes may be removed by a workman working from a position inboard of the brake assembly 10 as is described below.

As may be seen most clearly from FIG. 1, brake shoe 38 has "negative offset." This term describes the orientation of the brake shoe wherein the center line of the brake shoe is located inboard of the interface between spider 12 and flange 16. The brake shoe center line extends through the centers of both of springs 62 and 64 as viewed in FIG. 1.

This arrangement allows springs 62 and 64 effectively to be secured to the inboard face of spider 12 and allows the points of attachment at pins 66 and 68 readily to be accessible from inboard brake assembly 10 as may be seen from FIG. 2. The procedure for removing brake shoe 38 thus first involves detaching springs 62 and 64 from pins 66 and 68. A simple tool such as a screwdriver may be utilized for this operation. It may be desirable to adjust the inactivated position of one or both of actuating members 34 and 36 prior to the detachment of springs 62 and 64 in order to lessen the tension forces on these springs and facilitate their removal from pins 66 and 68.

Inboard retaining members 48 and 49 then are removed by removal of fasteners 48a and 49a. Brake shoe 38 then is free to be manipulated manually and moved in an inboard direction along the axis of axle member 18 for removal from brake assembly 10. The second brake shoe not illustrated may be removed in a manner similar to the removal of brake shoe 38.

It thus may be seen that this invention provides a vehicle brake assembly having brake shoes that may be removed from the assembly for inspection and/or repair without the necessity of removing from the vehicle axle mounting the assembly structure located outboard of the assembly.

I claim:

1. A vehicle brake assembly adapted to be mounted on a vehicle axle member, said axle member having a radial projection extending therefrom, said brake assembly including: a brake shoe supporting member surrounding said axle outboard of said projection and having an inboard surface at least a portion of which abuts the outboard face of said projection, at least one brake shoe carried by said supporting member and capable of radially directed movement relative thereto, and brake shoe actuating means carried by said supporting member, operatively bearing on said brake shoe and capable of exerting a force urging said brake shoe radially outwardly towards and into contact with a surrounding brake drum, and resilient means having one portion thereof operatively secured to said brake shoe, another portion thereof operatively secured to said inboard surface of said supporting member and positioned inboard of said supporting member, said resilient means exerting a force acting on said brake shoe in a direction opposite the direction of the force exerted by said actuating means.

2. A vehicle brake assembly according to claim 1, further including a pair of axially spaced apart retaining means projecting radially from said supporting member and defining therebetween a channel in which said brake shoe is received, said retaining means normally being spaced apart axially a distance such that said retaining means prevent axial movement of said brake shoe, the inboard of said retaining means being removable from said supporting member to permit inboard directed axial movement of said brake shoe.

3. A vehicle brake assembly according to claim 1, wherein said brake shoe is formed with a generally radially extending passageway formed therein and being open through the surface of said brake shoe proximate the axis of said axle member, said resilient means being elongated and having one end thereof operatively secured to said brake shoe within said passageway and extending radially inwardly out of said passageway to a point whereat the other end of said resilient means is operatively connected to the inboard surface of said supporting member.

4. A vehicle brake assembly according to claim 3, wherein said resilient means comprises a tension coil spring.

5. A vehicle brake assembly adapted for mounting on an elongated generally horizontal vehicle axle member, said axle member having a radially projecting flange extending therefrom, said brake assembly including: a spider having a central aperture extending therethrough and receiving said axle member such that a portion of the inboard surface of said spider abuts the outboard surface of said flange, said spider being secured to said flange by fastening means, at least one brake shoe carried by said spider radially outwardly thereof and capable of radial movement relative thereto, said brake shoe being located inboard of the interface between said spider and said flange, tension spring means operatively interconnecting said brake shoe and said spider and being located inboard of said spider, said spring means exerting a force urging said brake shoe toward said spider, and brake shoe actuating means carried by said supporting member and contacting said brake shoe, said actuating means having an inoperative condition wherein said actuating means are positioned such that said spring is placed under a first tension and an operative condition wherein said actuating means exert a force overcoming the force of said spring and urging said brake shoe outwardly towards and into contact with a surrounding brake drum.

6. A vehicle brake assembly according to claim 5, further including a pair of axially spaced apart retaining means projecting radially from the outer periphery of said spider and defining therebetween an outwardly open ended channel in which said brake shoe is positioned, said retaining means normally being spaced apart axially a distance such that said retaining means prevent axial movement of said brake shoe, the inboard of said retaining means being removable from said spider to permit axially inboard directed movement of said brake shoe.

7. A vehicle brake assembly according to claim 5, wherein said brake shoe is formed with a generally radially extending passageway formed therein and being open through the surface of said brakeshoe proximate the axis of said axle member, said resilient means being elongated and having one end thereof operatively secured to said brake shoe within said passageway and extending radially inwardly out of said passageway to a point whereat the other end of said resilient means is operatively connected to the inboard surface of said spider.

8. A vehicle brake assembly according to claim 5, wherein said brake shoe comprises a main body and a brake lining secured to the outer surface of said main body, said main body having a recess formed therein proximate said lining, a spring attachment member positioned in said recess, said main body having a passageway extending from said recess through the inward surface thereof, said spring means comprising an elongated coil spring having a portion thereof extending into said passageway and terminating in one end that is secured to said attachment member, the other end of said spring being operatively secured to the inboard surface of said spider.

9. A vehicle brake assembly according to claim 5, wherein said spring means comprises an elongated coil spring, the inboard surface of said spider having a pin extending therefrom, one end of said spring being attached to said pin at a point readily accessible from inboard of said brake assembly.

* * * * *